US007212650B2

(12) United States Patent
Sumi

(10) Patent No.: US 7,212,650 B2
(45) Date of Patent: May 1, 2007

(54) MONITORING SYSTEM AND MONITORING METHOD

(75) Inventor: Noriaki Sumi, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 723 days.

(21) Appl. No.: 10/320,633

(22) Filed: Dec. 17, 2002

(65) Prior Publication Data

US 2003/0231787 A1 Dec. 18, 2003

(30) Foreign Application Priority Data

Jun. 14, 2002 (JP) ............................. 2002-174201

(51) Int. Cl.
*G06K 9/00* (2006.01)
*H04N 7/18* (2006.01)

(52) U.S. Cl. ...................... 382/103; 348/143; 348/169; 348/700

(58) Field of Classification Search ................. 382/236
See application file for complete search history.

(56) References Cited

U.S. PATENT DOCUMENTS

| 5,054,097 | A | * | 10/1991 | Flinois et al. ................ 382/294 |
| 5,243,418 | A | * | 9/1993 | Kuno et al. .................. 348/155 |
| 5,969,755 | A | * | 10/1999 | Courtney ..................... 348/143 |
| 6,424,370 | B1 | * | 7/2002 | Courtney ..................... 348/143 |
| 6,456,320 | B2 | * | 9/2002 | Kuwano et al. ............. 348/143 |
| 6,570,608 | B1 | * | 5/2003 | Tserng ........................ 348/143 |
| 6,636,635 | B2 | * | 10/2003 | Matsugu ...................... 382/218 |
| 6,678,413 | B1 | * | 1/2004 | Liang et al. ................. 382/181 |
| 6,819,353 | B2 | * | 11/2004 | Heyden ....................... 348/143 |

FOREIGN PATENT DOCUMENTS

| JP | 2000-216 | 1/2000 |
| JP | 2000-278584 | 10/2000 |
| JP | 2001-28086 | 1/2001 |
| JP | 2001-69494 | 3/2001 |

OTHER PUBLICATIONS

I. Haritaoglu, D. Harwood, L. S. Davis, "W4: Real-Time Surveilance of People and Their Activities", IEEE Trans. Pattern Analysis and Machine Intelligence, vol. 22, No. 8, Aug. 2000, pp. 809-830.*
M. Kaneta, K. Kanemaru, H. Kanoh and T. Nagai, "Image Prcoessing Method for Intruder Detection around Power Line Towers", IEEE Trans. Inf. & Syst, vol. E76-D, No. 10, Oct. 1993, pp. 1153-1161.*

* cited by examiner

*Primary Examiner*—Jingge Wu
*Assistant Examiner*—Yuzhen Ge
(74) *Attorney, Agent, or Firm*—Buchanan Ingersoll & Rooney PC

(57) ABSTRACT

A camera picks-up at least two images of a region where an object is present. A monitoring unit monitors the object and displays the images of the object on a display for a user. The monitoring unit obtains a difference image of the two images, and removes an image of a moving object that may be considered as a background image from the difference image to thereby obtain an image of the object. The monitoring unit determines the image of the moving object as the background image based on an area of the image of the moving object. The monitoring unit determines a state of the object based on barycentric positions of the images of the moving objects in the difference image.

15 Claims, 6 Drawing Sheets

FIG.3

| LAYER 1 | LAYER 2 | LAYER 3 |
|---------|---------|---------|
| TIME 1 | DYNAMIC IMAGE 1 | ATTRIBUTE DATA ⋮ |
| | DYNAMIC IMAGE 2 | ATTRIBUTE DATA ⋮ |
| | ⋮ | ⋮ |
| TIME 2 | DYNAMIC IMAGE 1 | ATTRIBUTE DATA ⋮ |
| | DYNAMIC IMAGE 2 | ATTRIBUTE DATA ⋮ |
| | ⋮ | ⋮ |
| ⋮ | ⋮ | ⋮ |

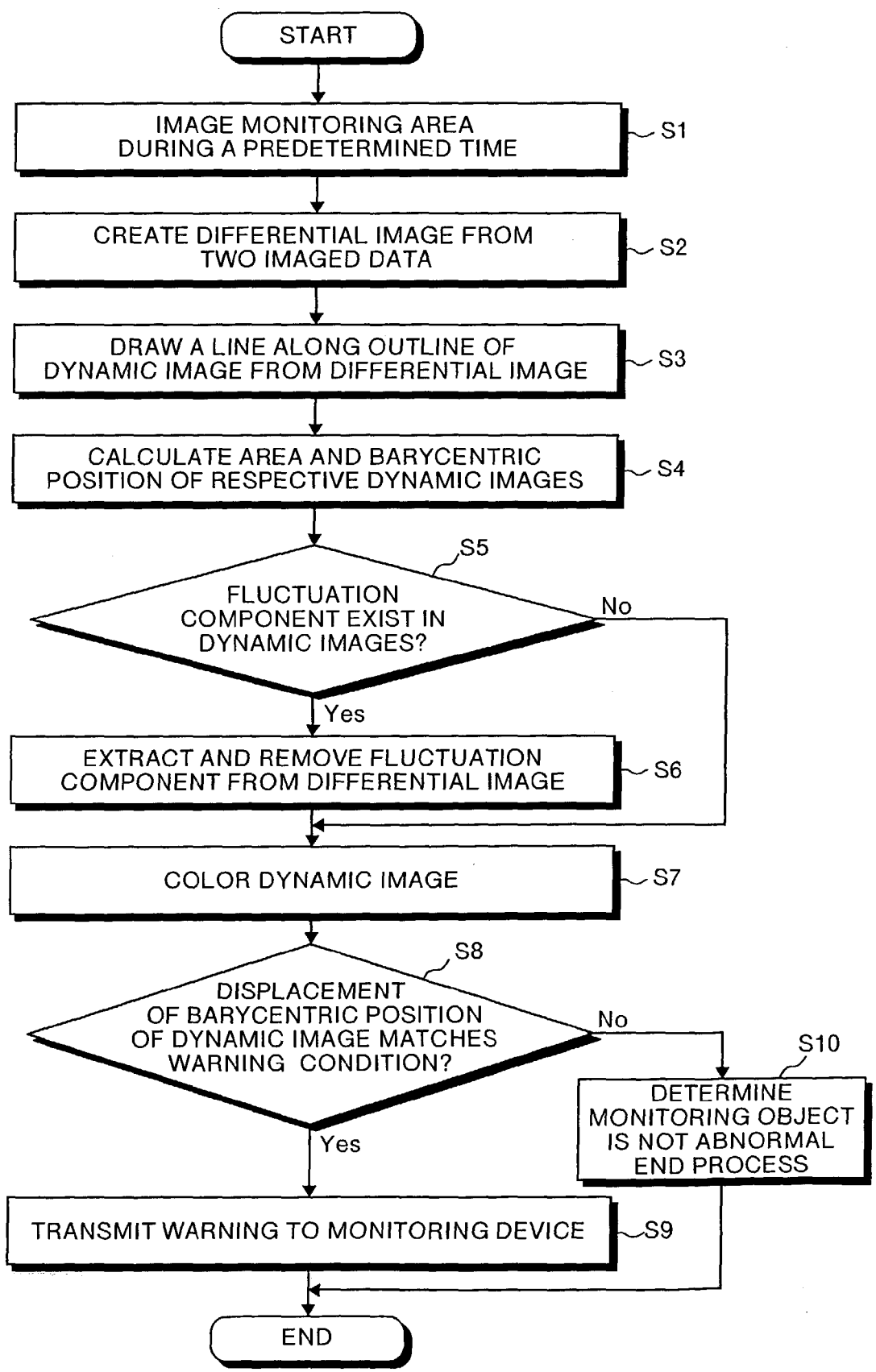

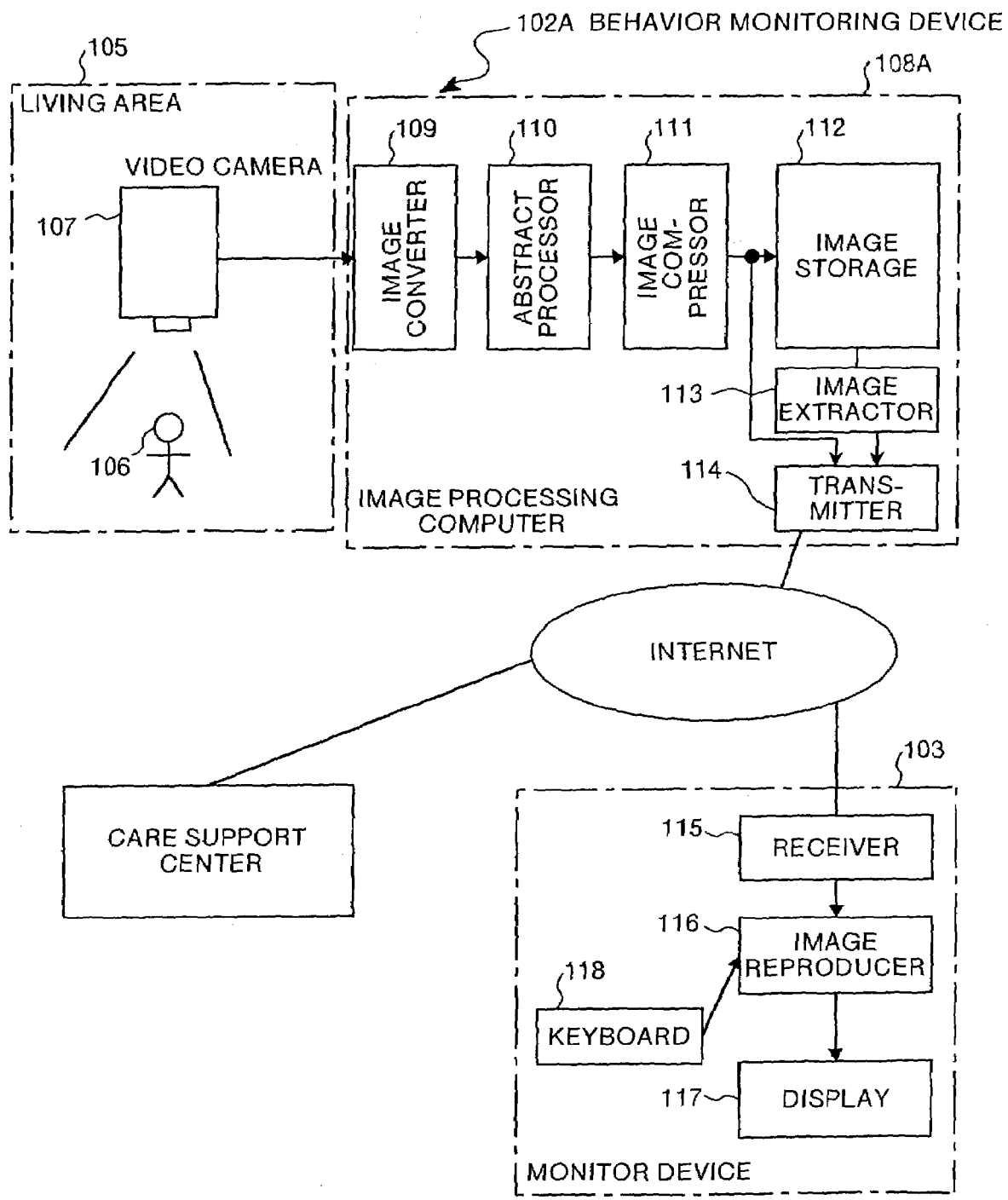

MONITORING SYSTEM AND MONITORING METHOD

BACKGROUND OF THE INVENTION

1) Field of the Invention

The present invention relates to a monitoring system and a monitoring method capable of monitoring a person's movements while maintaining privacy.

2) Description of the Related Art

FIG. 7 is a block diagram that shows the components of a conventional behavior monitoring device and a behavior monitoring and supporting system disclosed in Japanese Patent Application Laid-Open No. 2000-000216. The disclosed system has a behavior monitoring device 102A and a monitoring device 103. The behavior monitoring device 102A includes a video camera 107 set in a living area 105 that monitors a person 106, and an image processing computer 108A that processes a signal obtained in the video camera 107. The monitoring device 103 monitors an image signal transmitted from the behavior monitoring device 102A in a remote place. The monitoring device 103 is connected to the behavior monitoring device 102A through the internet. The video camera 107 continuously picks-up an image of the person 106.

The image signal picked up by the video camera 107 is converted into a digital image signal by an image converter 109 in the image processing computer 108A. The image converter 109 executes a predetermined correction with respect to the signal and supplies it to an abstraction processor 110. The abstract processor 110 makes the image of the person abstract, based on an abstracting process, to protect the privacy of the person. The abstracting process is, for example, applying mosaic to a part of the image (first method). On the other hand, a difference between the real image and a background image, i.e., an image of the person alone is obtained, and the difference image is blacked out (second method). The abstract image signal is supplied to an image compressor 111 that compresses the signal. The compressed image signal is stored along with the time information in an image storage 112.

When the monitoring device 103 makes an access to the image processing computer 108A, an image extractor 113 extracts the stored time-series image signals and transmits them to the monitoring device 103 through a transmitter 114 and the Internet. A receiver 115 in the monitoring device 103 receives the image signals through the Internet. An image reproducer 116 reproduces the image signals. A display 118 displays the image signals. Thus, an abstract image of the person 106 is displayed on the display 117.

When the first method is employed as the abstracting process, there arises a problem that the person's movements cannot be read in detail. When the second method is employed as the abstracting process, there is a problem that a pick-up range of the video camera 107 becomes limited. In addition, if there is considerable movement in the image pick-up area, images picked-up for a considerable period are required to be averaged to obtain the background image, and sometimes the background image can not be obtained at all.

SUMMARY OF THE INVENTION

It is an object of the present invention to provide a monitoring system and a monitoring method capable of monitoring a person at real time. It is also an object of the present invention to image the monitored person by accurately extracting the movements of the person without fixing an image pick-up device and to protect the privacy of the person.

The monitoring system according to one aspect of the present invention comprises an image pick-up unit that obtains at least two images of a region where an object to be monitored is present at different timing; a monitoring unit that extracts an image of the object from the images picked-up by the image pick-up unit, determines a state of the object, and transmits the image of the object and the state of the object; and a display unit that receives and displays the image of the object and the state of the object for an observer. The monitoring unit includes an outline extracting unit that obtains a difference image from the two images picked up by the image pick-up unit, extracts outlines of objects in the difference image to extract images of moving objects in the difference image; an attribute processing unit that calculates areas and barycentric positions of the images of the moving objects in the difference image; a fluctuation extracting unit that determines an image of the moving object that may be considered as the background image based on the area of the image of the moving object in the difference image and subtracts the image of the moving object that may be considered as the background image from the difference image to thereby extract an image of the object; and a determination unit that determines the state of the object based on the barycentric positions.

The monitoring method according to one aspect of the present invention is a method of monitoring an object present in a region using a monitoring unit. The monitoring unit includes an image pick-up unit that obtains at least two images of the region at different timing; a monitoring unit that extracts an image of the object from the images picked-up by the image pick-up unit, determines a state of the object, and transmits the image of the object and the state of the object; and a display unit that receives and displays the image of the object and the state of the object for an observer. The monitoring method comprises obtaining a difference image from the two images picked up by the image pick-up unit; extracting outlines of objects in the difference image to extract images of moving objects in the difference image; calculating areas and barycentric positions of the images of the moving objects in the difference image; determining an image of the moving object that may be considered as the background image based on the area of the image of the moving object in the difference image; subtracting the image of the moving object that may be considered as the background image from the difference image to thereby extract an image of the object; and determining the state of the object based on the barycentric positions.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a diagram that shows one example of an image data storing method in an image data storage;

FIG. 5 is a flowchart that shows an operating process of the monitoring system;

FIG. 7 is a block diagram that shows a conventional example of a behavior monitoring device and a behavior monitoring supporting system.

DETAILED DESCRIPTIONS

Embodiments of the monitoring system and the monitoring method according to the present invention are explained below with reference to the accompanying drawings.

Figure 1:
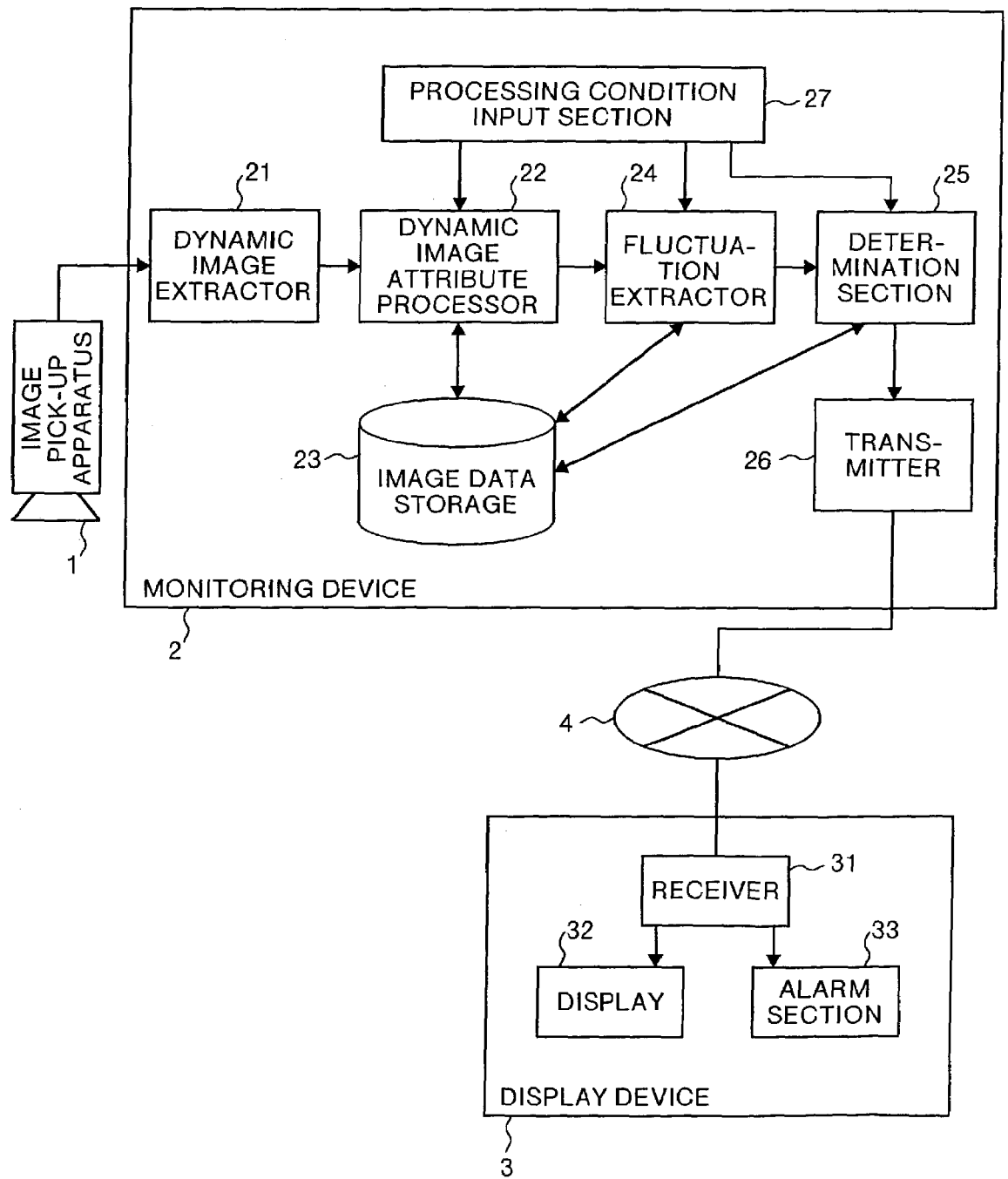
FIG. 1 is a block diagram showing a monitoring system of the present invention.

FIG. 1 is a block diagram that shows the structure of the monitoring system of the present invention. The monitoring system has an image pick-up apparatus 1, a monitoring device 2, and a display device 3. The image pick-up apparatus 1 picks-up images of an area that is monitored (monitored area). The monitoring device 2 processes the imaged data picked up by the image pick-up apparatus 1 and performs the monitoring. The monitoring is usually performed by a person. The display device 3 displays the difference image and the monitored result transmitted from the monitoring device 2. The monitoring device 2 and the monitoring device 3 may be connected by a cable if the distance between the two devices is short (e.g., when the devices are installed on different floors of the same building). The monitoring device 2 and the display device 3 may also be connected through a network 4 such as the Internet or a leased line. FIG. 1 shows the case of the monitoring device 2 and the display device 3 connected through the network 4.

The image pick-up apparatus 1 consists of a CCD image pick-up device or the like. The images picked-up by the image pick-up apparatus 1 are supplied to a dynamic image extractor 21 in the monitoring device 2. An image pick-up area of the image pick-up apparatus 1 may be fixed or may be changed in accordance with the movements of the objects in the monitored area.

The monitoring device 2 consists of the dynamic image extractor 21, a dynamic image attribute processor 22, an image data storage 23, a fluctuation extractor 24, a determination section 25, a transmitter 26, and a processing condition input section 27. The dynamic image extractor 21 calculates the attribute data of the area and the barycentre of all the dynamic objects that is extracted. The image data storage 23 stores the image data that comes from the difference image and the calculated attribute data. The fluctuation extractor 24 extracts the background image from the dynamic image and deletes it. The determination section 25 determines the person being monitored is in danger based on the image data. The transmitter 26 transmits the difference image and the determined result to the display device 3. The processing condition input section 27 inputs the process status to all the processors.

The dynamic image extractor 21 creates a difference image and extracts dynamic images. The dynamic image attribute processor 22 calculates attribute data such as areas and barycentric positions of the respective extracted dynamic images. The image data storage 23 stores the image data composed of the difference image and the calculated attribute data. The fluctuation extractor 24 extracts and removes a background image from the dynamic images. The determination section 25 determines whether the person that is being monitored is in danger based on the image data. The transmitter 26 transmits the difference image and the determined result to the display device 3. The processing condition input section 27 inputs the processing conditions into the respective processors.

The dynamic image extractor 21 performs a difference operating process for binarizing an absolute value of a difference of respective pixel values in two imaged data. The image data is picked up by the image pick-up apparatus 1 that monitors the area in a predetermined time, based on a predetermined threshold value so as to create a difference image. The object that moves when the two imaged data are picked up, is recorded as an image in the difference image. The dynamic image of the moving object is extracted from the created difference image and a line is drawn along the outline of the dynamic image. The dynamic image extractor 21 outputs the difference image to the dynamic image attribute processor 22.

Figure 2A:
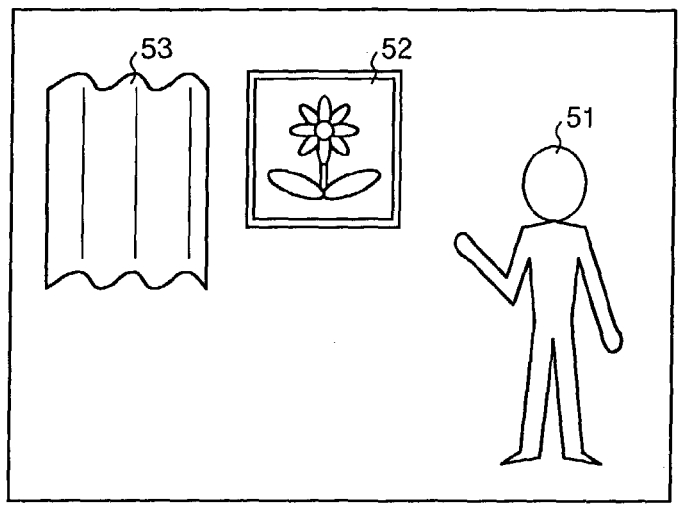
FIGS. 2A and 2B are diagrams that show examples of an imaged data and a difference image created from the imaged data.
Figure 2B:
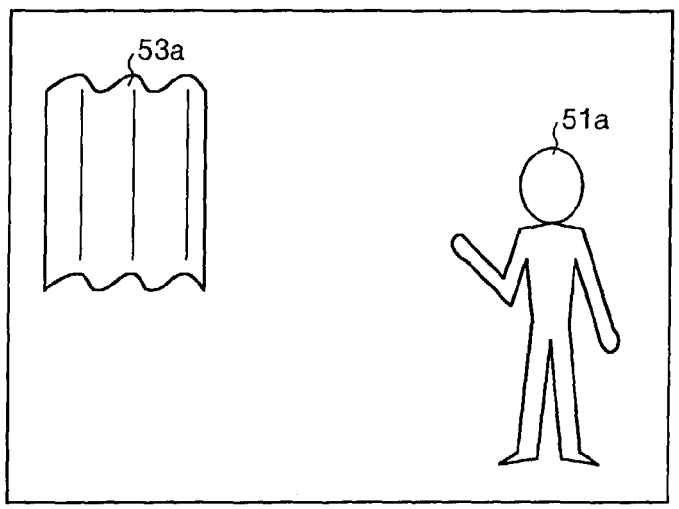

FIGS. 2A and 2B are examples of the imaged data and the difference image created from the imaged data. FIG. 2A shows an image of a person 51 to be monitored, a painting 52 on the wall, and a curtain 53 flapped by wind. FIG. 2B is a difference image that is created from the imaged data of FIG. 2A and another imaged data picked up during a predetermined time and from which an outline is extracted. The difference image shows a moving person 51a and a curtain 53a.

The dynamic image attribute processor 22 calculates the areas and the barycentric positions of the dynamic images created by the dynamic image extractor 21. The dynamic image attribute processor 22 stores the image data of the areas and the barycentric positions of the dynamic difference image along with the time information in the image data storage 23. The barycentric positions are obtained two-dimensionally by using the areas obtained by the outlines of the dynamic images. The barycentric positions may also be obtained cubically.

The image data storage 23 stores the image data from the dynamic image attribute processor 22 and the fluctuation extractor 24 along with the time information. FIG. 3 shows one example of an image data storage method. The image data storage 23 manages the image data according to each layer. In the example shown in FIG. 3, the imaging duration is a layer 1. A layer 2 stores the dynamic image is provided below the first layer 1. In the layer 2, identification numbers that are determined collectively are allocated to the dynamic images, when a plurality of dynamic images exist in the monitor area. A layer 3 is provided below the layer 2. The layer 3 stores and manages the attributes (attribute data) of the dynamic images present in the layer 2. The layer 3 can also store the colors for coloring insides of the outlines of the dynamic images and heights of the dynamic images as the attribute data, apart from the areas and the barycentric positions of the dynamic images.

The fluctuation extractor 24 refers to the image data stored in the image data storage 23 and extracts and removes the moving background as a fluctuation component.

The moving background that is removed and extracted by the fluctuation extractor 24 is not monitored in the dynamic images of the difference image obtained from the dynamic image attribute processor 22. Further the moving background is removed according to predetermined conditions that judge the fluctuation component. The dynamic image in the difference image from which the fluctuation component is removed is colored with black. For example, the information about the black color that is used to color the area from which the fluctuation component is removed is stored in the attribute data of the corresponding dynamic image in the image data storage 23. When a plurality of dynamic images exist, the dynamic images may be colored with different colors, persons, numbers, symbols or the like for identifying the dynamic images. The fluctuation extractor 24 outputs the difference image from which the fluctuation component is removed to the determination section 25.

The conditions for removing a fluctuation component are explained below. For example, the following two references can be set as the conditions for removing a fluctuation component:

(1) The dynamic image is a fluctuation component when a fluctuating width of an area of a certain dynamic image is larger than a predetermined value, and
(2) The dynamic image is a fluctuation component when a barycentric position of a certain dynamic image does not move out of a certain range.

In reference (1), the area of a person who faces the camera has a maximum value of $S_{max}$. The area of a person who is facing sideways in front of the camera has a minimum value of $S_{min}$. The fluctuating width of the area of a certain dynamic image is $\Delta S$. The fluctuation component is extracted and removed according to the condition that only when $\Delta S \geq S_{max} - S_{min}$, the dynamic image is the fluctuation component. In the case of the reference (1), for example, when the curtain is changed by a strong wind or the like from a folded-up state into a spread state, the fluctuation extractor 24 determines that the movement of the curtain is not that of the monitored object. The fluctuation extractor 24 then removes the dynamic image of the curtain from the difference image.

In reference (2), for example, the maximum value of the distance from the barycentric position is T, when the object in the monitoring area is in a still state or a fixed position. Moreover, when the barycentric position of a dynamic image at a certain time is a referential position, a distance from the barycentric position of the dynamic image is SS. In this case, a fluctuation component can be extracted and removed according to the conditions that only when $SS \leq T$, the dynamic image is the fluctuation component. In the case of reference (2), for example, when the trailing form of the curtain changes due to strong wind, the barycentric position of the curtain also changes within a predetermined range. The fluctuation extractor 24 accordingly determines that the movement of the curtain is not that of the monitored object and removes the dynamic image of the curtain from the difference image. When the fluctuation component is extracted, time can be also be added as parameters. It is also necessary to set a time value within a range where the fluctuation component and the movement of the monitored object is differentiated from the barycentric position of the stored dynamic images. For example, when the monitored object is rocked in a rocking chair, the rocking state should not be determined as the fluctuation component. In order that the monitored object should not be determined as a fluctuation component, the time parameter for the rocking state has to be set so that it is not determined as a fluctuation component. The condition for judging the fluctuation component is set such that the dynamic image is a fluctuation component when $SS \leq T$ from present time till before two hours. The conditions for judging the fluctuation components are stored in the fluctuation extractor 24. The fluctuation component is thus removed by the fluctuation extractor 24 based on the judging references (1) and (2). In another way, a system user may select and remove a dynamic image other than the person to be monitored from the processing condition input section 27.

Figure 4:
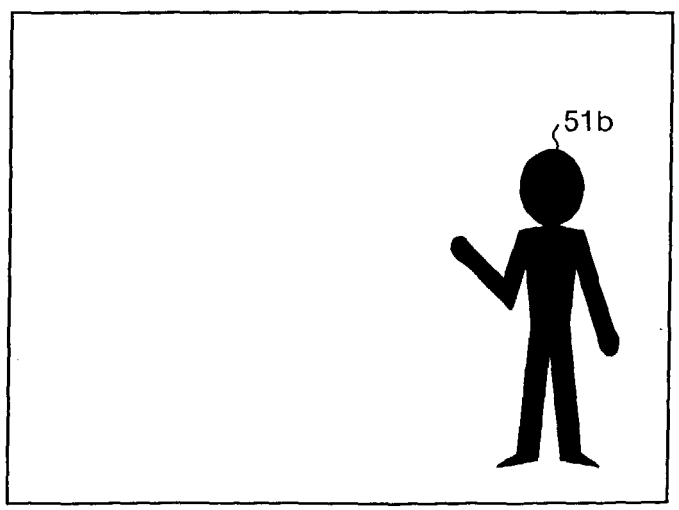
FIG. 4 is a diagram that shows a difference image from which a fluctuation component is removed.

FIG. 4 shows a difference image in which a curtain as the fluctuation component is extracted and removed from the difference image of FIG. 2B by the fluctuation extractor 24. Reference symbol 51*b* indicates a colored image of the monitored object. The determination section 25 receives the difference image from the fluctuation extractor 24. The determination section 25 uses the image data stored in the image data storage 23. The determination section 25 determines any dangerous state of the monitored object from the displacement of the barycentric position based on predetermined warning conditions. When the monitored object is not in a dangerous state, the determination section 25 outputs the difference image to the transmitter 26. When the determination section 25 determines that the monitored object is in a dangerous state, a warning message or a warning sound is added to the difference image. Two examples of predetermined warning conditions are given next. The first warning condition is the case when the state of displacement of barycentric position is greater than 30 cm and the displacement continues for 5 minutes between the 0th hour to the 24th hour. In the first case, the movement of the monitored object is stopped due to the diagnosis of an external attack. The second warning condition is the case when the displacement of the barycentric position is greater than 100 cm between the 0th hour to the 24th hour. In the second case the monitored object falls from a bed or jumps out of a window. In such a manner, similar warning conditions can also be set beforehand. For example, when the displacement of the barycentric position is greater than 30 cm and the state of displacement continues for 5 minutes between the 7th hour and the 22nd hour, a warning is issued. Similarly when the displacement of the barycentric position is greater than 100 cm and is generated between the 22 hour and the 7th hour, a warning is issued. The warning conditions are stored in the determination section 25 in advance.

The transmitter 26 transmits the difference image, and the warning message or sound to the display device 3. When the monitored object is not in the dangerous state, the difference image processed by the fluctuation extractor 24 is transmitted to the display device 3. When the monitored object is in a dangerous state, the difference image and the warning message or sound added by the determination section 25 are transmitted to the display device 3.

The processing condition input section 27 inputs the color to the dynamic image attribute processor 22 when the dynamic image is colored. The processing condition input section 27 selects the background image for the fluctuation extractor 24. The processing condition input section 27 also inputs the warning condition to the determination section 25.

The display device 3 has a receiver 31, a display 32, and an alarm section 33. The receiver 31 receives the difference image and the warning message or sound from the monitoring device 2. The display 32 is cathode ray tube (CRT) display or a liquid crystal (LCD) display. The display 32 displays the difference image and the warning message received from the transmitter 26. The alarm section 33 consists of a speaker or the like and issues the received warning sound. The outline of the monitored object is displayed on the display 32. It is hence possible to protect the privacy of the monitored object is protected and confirm the fine movements of the monitored object. The supervisor who monitors the display device 3 takes appropriate measures for the dynamic images on receiving the warning.

The operating procedure of the monitoring system is explained next with reference to the flowchart shown in FIG. 5. The image pick-up apparatus 1 is installed in a room. The image pick-up apparatus 1 images a monitoring area during a predetermined time (step S1). For example, the predetermined time or the sampling time is set arbitrarily to every 0.5 sec, 1 sec, 2 sec or the like. The dynamic image extractor 21 receives two imaged data that is picked up during a predetermined time. The dynamic image extractor 21 creates a difference image from the two imaged data (step S2). The dynamic image extractor 21 then draws lines along the outlines of the dynamic images from the obtained difference image (step S3). The dynamic image attribute processor 22 calculates the area and the barycentric positions of the dynamic images (step S4). The dynamic image attribute processor 22 then stores the calculated area and barycentric position as the attribute data, along with the difference image and the time information into the image data storage 23.

The fluctuation extractor 24 determines the existence of a fluctuation component in the extracted dynamic image based on certain conditions. The fluctuation extractor 24 determines the existence of a fluctuation component from the change in the area and barycentric position that occurs from the predetermined time to the present (step S5). When a fluctuation component exists (step S5: Yes), the fluctuation component is extracted and removed from the difference image (step S6). When the fluctuation component does not exist (step S5: No), the fluctuation extractor 24 colors the dynamic image in the difference image from which the fluctuation component is removed (step S7). The fluctuation extractor 24 then stores the colored content in the attribute data of the corresponding dynamic image in the image data storage 23.

The determination section 25 determines the abnormality in the movement of the barycentric position of the monitored object in the difference image that is stored in the image data storage 23. The displacement of the barycentric position occurring between the predetermined time and the current time is determined by certain preset warning conditions (step S8). The determination section 25 transmits the difference image with the warning message or sound, when the displacement of the barycentric position is not normal and coincides with the warning condition (step S8: Yes). The determination section 25 transmits the difference image to which the warning message and warning sound are added, to the display device 3 through the communication line or the network 4. The process for the imaged data obtained at step S1 is terminated (step S9). When the displacement of the barycenter is normal and does not match with any of the warning conditions at step S8 (step S8: No), the monitored object is considered to be normal (step S10). The process for the imaged data obtained at step S1 is then terminated. The dynamic image which is the fluctuation component is removed from the difference image at step S6. But the attribute data such as area and barycentric position are not deleted from the image data storage 23.

In the present invention, the number of monitored objects existing in the monitor area is not limited. The explained process can be used to monitor one or many objects. Even if many monitored objects exist, the dynamic images are easily managed as identification numbers are allocated to the dynamic images in the difference image. The outlines of the dynamic images are colored at step S7. The dynamic images may be also be colored with different colors, or persons, numbers or symbols to identify the respective dynamic images.

Figure 6A:
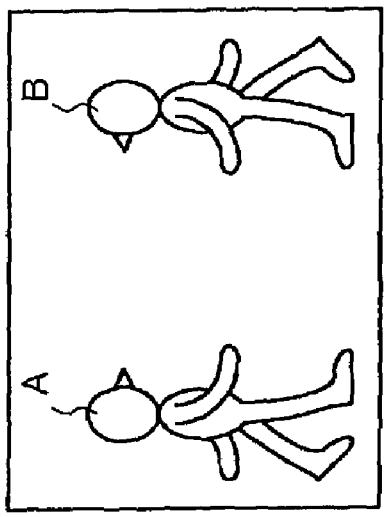
FIGS. 6A to 6E are diagrams that show difference images when two persons overlap in a monitoring area.
Figure 6B:
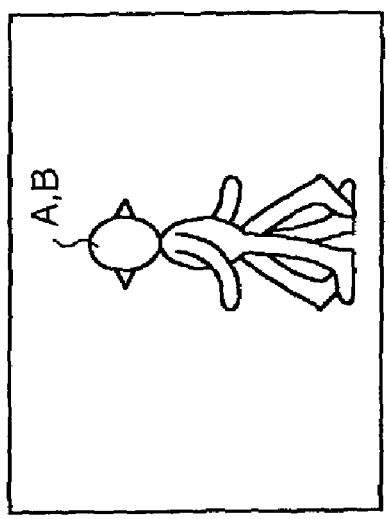
Figure 6C:
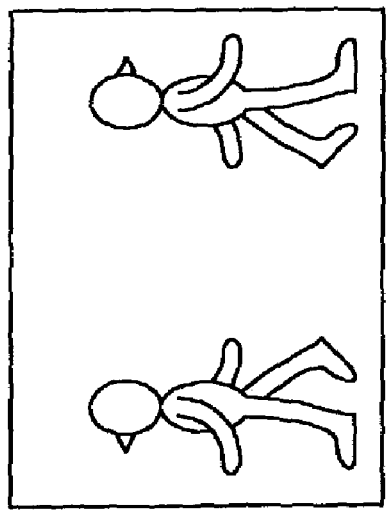
Figure 6D:
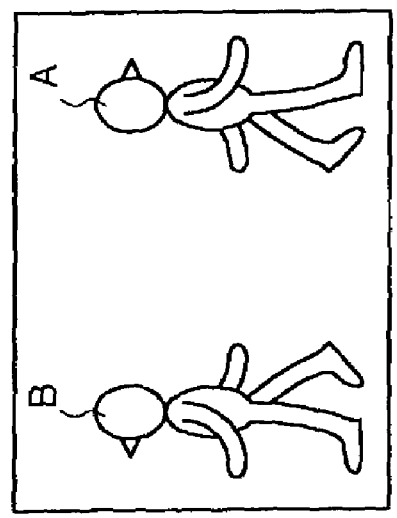
Figure 6E:
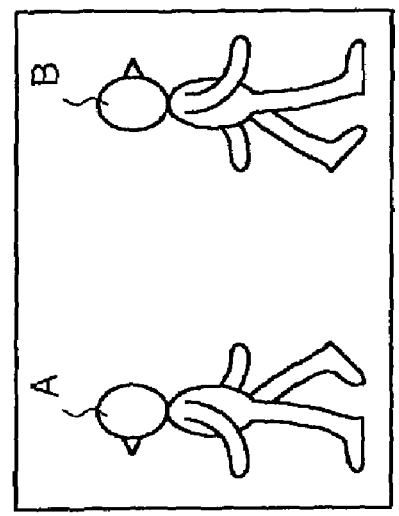

In case of multiple monitored objects, for example, when there are 2 monitored objects, the two monitored objects overlaps with each other when viewed from the image pick-up apparatus 1. Hence it is necessary to differentiate the overlapped dynamic images from the dynamic images before the overlapping. FIGS. 6A to 6E shows a series of difference images before and after the overlapping, when the two person overlap with each other when viewed from the image pick-up apparatus 1. FIG. 6A shows a state before the two persons A and B overlap, FIG. 6B shows a state at the moment the persons A and B overlap, and FIG. 6C show a state after the persons overlap. The difference image of FIG. 6C has two cases of FIG. 6D and FIG. 6E. FIG. 6D is a state after persons A and B cross, FIG. 6E is a state when persons A and B retrace their steps after overlapping in FIG. 6B.

In the dynamic image attribute processor 22, the attribute data such as area, barycentric position, and height of the dynamic images after the persons overlap are compared with the attribute data before the persons overlap. The attribute data after the persons overlap are made to correspond with the attribute data before the persons overlap to cope with the situation when there are multiple monitored objects. The dynamic images of the respective persons are compared quickly as the image data are managed by the image data storage 23 having a layered structure. It is necessary that apart from identification numbers, areas, and barycentric positions, other attributes such as colors, persons, numbers, or symbols heights should be stored as attribute data of monitored objects on layer 3 of the image data storage 23. The attributes would serve to identify the monitoring objects. In this manner, only the dynamic image in the monitor area is displayed and the dynamic image from which the background is deleted is transmitted to the display device 3. The background image that includes the moving portion is displayed as the background. In this case, the moving background image uses the representative value of a fluctuation component.

According to the present invention, the fluctuation component is removed from the attribute data such as barycentric position and area of the dynamic image according to certain conditions that determine the fluctuation component. Hence the dynamic image other than the monitored object is canceled from the difference image at real time. Moreover, a line is drawn along the outline of the dynamic image area obtained by the difference image. The inside of the outline of the dynamic image is colored so that the abnormal state of a monitored person is monitored accurately from the movements of the person. Hence the privacy of the person is protected and a warning is issued in an abnormal situation.

According to the present invention, even when there are many monitored objects, the objects can be identified by persons, numbers, symbols, or colors, for example in a nursing home. Furthermore, since it is not necessary to perform a lengthy background process in order to obtain a difference image, it is not necessary to fix the imaging area of the image pick-up apparatus 1.

According to one aspect of the present invention, the monitoring device is provided with a dynamic image extracting unit, a dynamic image attribute processing unit, a fluctuation extracting unit, and a determination unit. The dynamic image extracting unit creates a difference image from the two imaged data picked up by the image pick-up apparatus in a predetermined time. The dynamic image extracting unit also extracts the outlines of the dynamic images based on the difference image. The dynamic image attribute processing unit calculates the attribute data such as areas and barycentric positions of the dynamic images. The fluctuation extracting unit removes the background image by the calculated attribute data from the difference image and extracts the dynamic image to be monitored. The determination unit determines the state of the dynamic image according to the change in the barycentric position within a predetermined time. As a result, the dynamic images other than the dynamic image to be monitored can be canceled from the difference image at real time. Moreover, a line is drawn along the outline of the dynamic image area obtained by the difference image and the inside of the dynamic image is colored. Hence it is possible to protect the privacy of the monitored person and accurately monitor the movements of the person. A warning is also issued during any abnormal state. Since it is not required to perform a lengthy background process in order to obtain a difference image, it is not necessary to fix the imaging area of the image pick-up apparatus.

According to another aspect of the present invention, the fluctuation extracting unit refers to the areas of the dynamic images calculated by the dynamic image attribute processing unit. The fluctuation extracting unit determines the dynamic image as a background image when a fluctuating width of the area is larger than a predetermined value. Hence the dynamic images other than the monitored object are extracted and removed from the difference image effectively.

According to still another aspect of the present invention, the fluctuation extracting unit refers to the barycentric position of the dynamic images calculated by the dynamic image attribute processing unit. The fluctuation extracting unit also determines the dynamic image as a background image when the barycentric position does not move out of a predetermined range. Hence, the dynamic images other than the monitored object are effectively extracted and removed from the difference image.

According to still another aspect of the present invention, the fluctuation extracting unit colors the inside of the outline of the dynamic image in the difference image from which the fluctuation component has been removed. Hence the movement of the monitored object is captured easily.

According to still another aspect of the present invention, the fluctuation extracting unit changes colors for the respective dynamic images in the difference image. Hence, even when there are many monitored objects in the monitoring area, they can be identified by allocating colors to them.

According to still another aspect of the present invention, the fluctuation extracting unit allocates persons, numbers or symbols to the dynamic images to identify the dynamic images in the difference image from which the fluctuation component has been removed. Hence, even when there are many monitored objects, they are identified by the identification information.

According to still another aspect of the present invention, the monitoring method includes the dynamic image extracting step, the dynamic image attribute processing step, the fluctuation extracting step, and the determination step. The dynamic image extracting step includes the creation of a difference image from two imaged data picked up by the image pick-up apparatus in a predetermined time and the extraction of the outlines of dynamic images based on the created difference image. The dynamic image attribute processing step calculates the area and barycentric positions of the dynamic images. The fluctuation extracting step removes a background image based on the calculated attribute data from the difference image and extracts the dynamic image to be monitored. The determination step determines the state of dynamic image according to a change in the barycentric position of the monitored object within a predetermined time from the calculated attribute data. As a result, the dynamic images other than the monitored object is canceled from the difference image at real time. Moreover, a line is drawn along the outline of the dynamic image area obtained by the difference image and the inside of the outline is colored. Hence the privacy of a person to be monitored is protected, and the movements of the person are monitored accurately and when there is an abnormal condition, a warning is issued. Further, since it is not required to perform a lengthy background process to obtain a difference image, it is not necessary to fix the imaging area of the image pick-up apparatus.

According to still another aspect of the present invention, at the fluctuation extracting step, the inside of the outline of the dynamic image in the difference image from which a fluctuation component is removed is colored. Hence, even when there are many monitored persons, the persons can be identified with the colors allocated to them and monitored.

According to still another aspect of the present invention, at the fluctuation extracting step, persons, numbers, or symbols are allocated to identify the dynamic images in the difference image from which a fluctuation component is removed. Hence, even when there are many monitored persons in the monitor area, the persons can be identified with identification information and monitored.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A monitoring system comprising:
   an image pick-up unit that obtains at least two images of a region where an object to be monitored is present at different timing;
   a monitoring unit that extracts an image of the monitored object from the images picked-up by the image pick-up unit, determines a state of the monitored object, and transmits the image of the monitored object and the state of the monitored object; and
   a display unit that receives and displays the image of the monitored object and the state of the monitored object for an observer,
   the monitoring unit including
      an outline extracting unit that obtains a difference image from the two images picked up by the image pick-up unit, extracts outlines of non-monitored objects and the monitored object in the difference image to extract images of moving objects in the difference image;
      an attribute processing unit that calculates areas and barycentric positions of each of the images of the moving objects in the difference image;
      a fluctuation extracting unit that determines an image of the moving object that may be considered as a moving background image based on the area of the image of the moving object in the difference image and subtracts the image of the moving object that may be considered as the moving background image from the difference image to extract an image of the monitored object without the moving background image; and
      a determination unit that determines the state of the monitored object based on the barycentric positions and the difference image from the fluctuation extracting unit.

2. The monitoring system according to claim 1, wherein the fluctuation extracting unit checks whether an amount of fluctuation in the area of an image of a moving object is larger than a predetermined value, and when the amount of fluctuation in the area is larger than the predetermined value determines the image of the moving object as the moving background image.

3. The monitoring system according to claim 1, wherein the fluctuation extracting unit checks whether an amount of movement of the barycentric position of an image of a moving object is within a predetermined region, and when the amount of movement of the barycentric position is within the predetermined region determines the image of the moving object as the moving background image.

4. The monitoring system according to claim 1, wherein the fluctuation extracting unit colors the inside of the image of the monitored object.

5. The monitoring system according to claim 1, wherein if there are a plurality monitored objects, the fluctuation extracting unit colors each monitored object with a different color.

6. The monitoring system according to claim 1, wherein if there are a plurality of monitored objects, the fluctuation extracting unit assigns a different character or a number or a symbol to each monitored object.

7. A monitoring system according to claim 1, wherein the fluctuation extracting unit determines the moving object is the moving background image based on the barycentric position of the moving object not moving beyond a predetermined range.

8. A monitoring system according to claim 1, wherein the determination unit determines the state of the monitored object from displacement of the barycentric position based upon predetermined conditions.

9. A monitoring system according to claim 1, wherein the difference image is based on an absolute value of a difference of respective pixel values in two images.

10. A monitoring method of monitoring an object present in a region using a monitoring unit, the monitoring unit including
an image pick-up unit that obtains at least two images of the region at different timing;
a monitoring unit that extracts an image of the monitored object from the images picked-up by the image pick-up unit, determines a state of the monitored object, and transmits the image of the monitored object and the state of the monitored object; and
a display unit that receives and displays the image of the monitored object and the state of the monitored object for an observer,
the monitoring method comprising:
obtaining a difference image from the two images picked up by the image pick-up unit;
extracting outlines of non-monitored objects and the monitored object in the difference image to extract images of moving objects in the difference image;
calculating areas and barycentric positions of each of the images of the moving objects in the difference image;
determining an image of the moving object that may be considered as a moving background image based on the area of the image of the moving object in the difference image;
subtracting the image of the moving object that may be considered as the moving background image from the difference image to extract an image of the monitored object without the moving background image; and
determining the state of the monitored object based on the barycentric positions and the difference images without the moving background image.

11. The monitoring method according to claim 10, further comprising coloring the inside of the image of the monitored object.

12. The monitoring method according to claim 10, if there are a plurality of monitored objects, further comprising assigning a different character or a number or a symbol to each monitored object.

13. A monitoring method according to claim 10, further comprising the step of determining the moving object is the moving background image based on the barycentric position of the moving object not moving beyond a predetermined range.

14. A monitoring method according to claim 10, further comprising the step of determining the state of the monitored object from displacement of the barycentric position based upon predetermined conditions.

15. A monitoring method to claim 10, further comprising the step of determining the difference image is based on an absolute value of a difference of respective pixel values in two images.

* * * * *